No. 625,943. Patented May 30, 1899.
F. B. WAIBEL & H. MEYTROTT.
ACETYLENE GAS LAMP.
(Application filed Oct. 28, 1898.)
(No Model.)
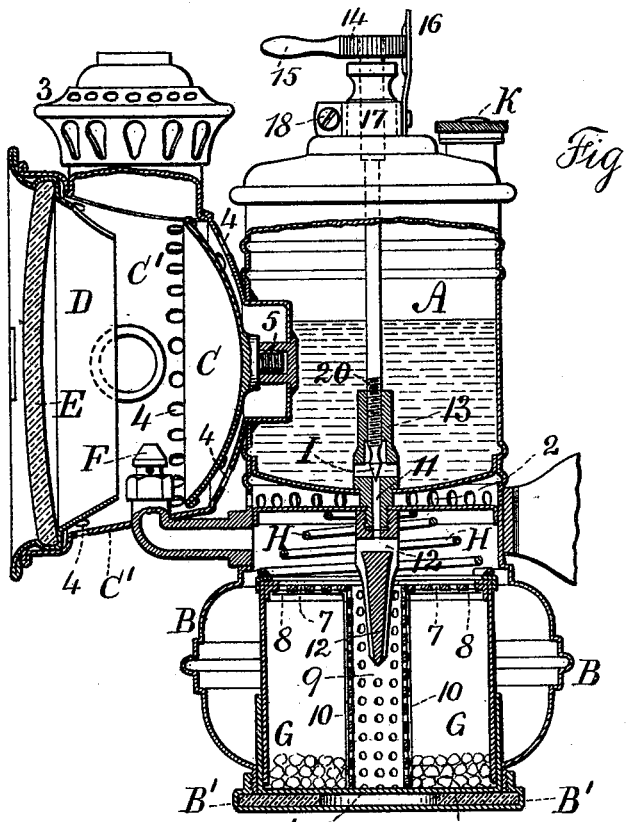

UNITED STATES PATENT OFFICE.

FREDERICK BRUNO WAIBEL AND HENRY MEYTROTT, OF NEW YORK, N. Y., ASSIGNORS TO THE MANHATTAN BRASS COMPANY, OF SAME PLACE.

ACETYLENE-GAS LAMP.

SPECIFICATION forming part of Letters Patent No. 625,943, dated May 30, 1899.

Application filed October 28, 1898. Serial No. 694,821. (No model.)

*To all whom it may concern:*

Be it known that we, FREDERICK BRUNO WAIBEL, residing at the city of New York, in the county of New York, and HENRY MEYTROTT, residing at New York, (Brooklyn,) in the county of Kings, State of New York, citizens of the United States, have invented an Improvement in Lamps for Cycles, of which the following is a specification.

This lamp is adapted to the use of calcium carbid or similar material for the generation of a combustible gas, and the lamp is made with reference to keeping the water-supply cool and also to regulating the water-supply with precision and by the touch, so that the rider can increase or lessen the flame at will and without the risk of either supplying too much water or cutting off the supply entirely; and the present invention consists in the devices hereinafter described and claimed.

In the drawings, Figure 1 is a vertical section of the improved lamp complete. Fig. 2 is a plan view showing the spring-dog and the notched ends of the valve-stem.

The water-holding vessel A is above the generating vessel B, and these two are connected by the metallic body; but this is made with perforations or open-work at 2 to allow the free circulation of air between the top of the generator and the bottom of the water vessel to keep the parts cool, and the reflector C is within a conical flame-chamber C', there being a cap or ventilator 3 at the top of the chamber C' to allow the products of combustion to pass off freely, and there are perforations 4, that admit air to the flame and also lessen the heat radiated from the reflector to the water-holding vessel, and there is a conical reflector D and lens or glass E in front of the flame that burns from the jet-tube F, the inner or back end of which pipe opens into the top of the generator B, and it is advantageous to provide a screw 5 upon the reflector, passing into a screw-socket in a recess at the back of the flame-chamber, the metal of which may have a hollow projection passing into an opening in the front of the water vessel and soldered firmly in position, as shown.

The generator is advantageously provided with a removable bottom B', screwed on, and within the generating-chamber there is a holder for calcium carbid or similar material, as shown at G, with a removable bottom G', that can be put on after the calcium carbid or similar material has been introduced into the holder, and the upper part of this holder is perforated, as shown at 7, for the passage of the gas, and a lining 8, of muslin or similar material, serves as a filter for the gas, and there is a central perforated tube 9, into which the water is allowed to pass and act upon the calcium carbid, and it is advantageous to surround this central tube also with muslin or similar fibrous material at 10, and by this means the calcium carbid is kept in position, and the holder being removable can be taken out and cleansed whenever desired and before the introduction of fresh calcium carbid, and we make use of a spring, preferably spiral, as shown at H, to prevent the carbid-holder becoming misplaced or producing any noise by concussion as the cycle is propelled.

In order to supply water into the calcium-carbid holder, we make use of a small tube 11, passing through the bottom of the water-holder and into the generator B, and in the said generator B is a conductor 12 as an extension of the tube 11, such conductor having lateral discharge-openings and also being grooved upon the surface, so that the water will follow this conductor by capillary action and pass into the central perforated tube 9 and act directly upon the calcium carbid, even if the cycle may be standing at an inclination, such conductor preventing the water from dropping upon the top of the carbid-holder.

Above the water-tube 11 is a valve I, the end of which is tapering and adapted to act at the upper end of the water-tube 11, and the screw 20 around the valve-stem acts within the stationary tubular nut 13, so that the valve closes the water-tube or opens the same more or less, according as the valve and stem may be rotated.

The valve-stem passes up through the top of the water-chamber and terminates with a knob 14, which is preferably cylindrical and notched on a portion of its edge, and there may be a handle 15 to afford the necessary leverage to turn the valve and stem either one way or the other. Of course when turned in one direction the valve is closed tightly upon its seat at the end of the water-tube 11, or if turned in the other direction the water-supply is opened more or less.

It is often important for the rider to be able to increase or lessen the flame of the lamp by the touch, and we provide a spring-dog 16 on a collar 17, that surrounds the neck that is central upon the top of the water-holding vessel, and this collar can be moved around the said neck and clamped at any desired position by a screw at 18, and it is advantageous to place this collar and dog in such a position that when the water is turned off the dog will be adjacent to a smooth cylindrical portion of the knob at the upper end of the valve-stem, and hence when the said knob and valve are turned to open the supply of water the dog does not act, but a minimum supply of water passes into the calcium carbid. If now the supply of water and the generation of gas and the size of the flame are to be increased, the rider can turn the head or knob so that the dog springs into the first notch or the second notch, or so on, according to the size required of the flame, and the movement of the dog is easily felt or even heard by the rider, and if the flame is too high the valve can be turned down one or two notches, and the dog not only allows the rider to appreciate the adjustment of the valve, but it holds the valve so that it is not liable to change its position by any vibration of the lamp upon the cycle. A screw-cap with a perforation in it is represented at K, that allows water to be introduced into the water-holding vessel from time to time, as required.

The lamp is to be supported by any desired clip or bracket, and the same does not form a part of the present invention.

It will be apparent that the calcium carbid or similar material being within the holder does not come into contact with any portion of the lamp proper, and the holder rests upon the rubber washer at 21, and the holder being smaller than the generating-chamber in the bottom of the lamp there is considerable space in which the acetylene gas may accumulate before passing to the burner, and the generating-chamber is easily kept clean, because the spent calcium carbid is removed in the holder.

We claim as our invention—

1. The combination in a cycle-lamp with the water-holding vessel and a generator below the same and permanently connected thereto, of a removable holder for the calcium carbid having a perforated upper end and a central tube, a separate removable bottom to the carbid-holder for separating the parts to remove the spent carbid, and a separate removable bottom to the case of the generator and screwed upon the same, and an elastic washer between the removable bottom and the generator, substantially as specified.

2. The combination in a cycle-lamp with the water-holding vessel and a generator below the same and permanently connected thereto, of a removable holder for the calcium carbid having a perforated upper end and a central tube, a separate removable bottom to the carbid-holder for separating the parts to remove the spent carbid and a separate removable bottom to the case of the generator and screwed upon the same, and an elastic washer between the removable bottom and the generator, and a spring between the upper part of the calcium-carbid holder and the top of the generator, substantially as set forth.

3. The combination with the calcium-carbid holder and the water-holding vessel above the same and the water-tube extending into the calcium-carbid holder, of a screw-valve for regulating the flow of water to the calcium carbid, the stem of the valve passing through the top of the water-holding vessel, a cylindrical knob and handle secured upon the valve-stem and having notches in the cylindrical edge, an open collar surrounding the neck of the water-holding vessel and a screw for clamping the same, and a spring-dog extending up from the collar and engaging the cylindrical notched head, substantially as set forth.

Signed by us this 21st day of October, 1898.

FREDERICK BRUNO WAIBEL.
HENRY MEYTROTT.

Witnesses:
JOHN J. WRENN,
W. H. BIRTWHISTLE.